United States Patent
Guzowski et al.

(10) Patent No.: US 6,299,176 B1
(45) Date of Patent: Oct. 9, 2001

(54) DUAL PURPOSE LOW INSERTION FORCE GASKET

(75) Inventors: Samuel Guzowski, San Jose (CR); Bradford G. Corbett, Jr., Fort Worth, TX (US)

(73) Assignee: S&B Technical Products, Fort Worth, TX (US)

( * ) Notice: Subject to any disclaimer, the term of this patent is extended or adjusted under 35 U.S.C. 154(b) by 0 days.

(21) Appl. No.: 09/261,862

(22) Filed: Mar. 3, 1999

(51) Int. Cl.$^7$ ................. F16L 17/03; F16J 15/10
(52) U.S. Cl. ............ 277/604; 277/609; 277/626
(58) Field of Search ................. 277/602, 604, 277/608, 609, 612, 616, 626

(56) References Cited

U.S. PATENT DOCUMENTS

| | | | |
|---|---|---|---|
| 3,020,054 | 2/1962 | Draincourt | 277/170 |
| 3,179,446 | 4/1965 | Paterson | 285/110 |
| 3,744,806 | 7/1973 | Keyser | 277/138 |
| 4,030,872 | 6/1977 | Parmann | 425/393 |
| 4,061,459 | 12/1977 | Parmann | 425/403 |
| 4,818,208 | 4/1989 | Petersson et al. | 425/392 |
| 4,856,561 | 8/1989 | Zicaro | 138/109 |
| 5,944,323 | 8/1999 | Cavka | 277/626 |

OTHER PUBLICATIONS

The Rieber Sealing System for PVC Pipes brochure. No Date.

*Primary Examiner*—James R. Brittain
*Assistant Examiner*—John L. Beres
(74) *Attorney, Agent, or Firm*—Bracewell & Patterson LLP

(57) ABSTRACT

A pipe sealing gasket is shown which is designed to be received within a groove provided within a socket end of a thermoplastic pipe. The gasket includes a ring shaped body which, when viewed in cross-section includes a leading nose region and a radially inwardly slanting primary sealing surface which forms a lip seal for engaging a mating spigot end during insertion, the primary sealing surface being joined to a secondary sealing surface by an intermediate circumferential groove region, the secondary sealing surface comprising a planar circumferential region which terminates in an inside corner of the gasket, the inside corner being connected to an outermost wall region of the gasket by an exterior gasket surface, the outermost wall region of the gasket being connected to the nose region of the gasket by vertical step which joins a uniformly sloping external gasket surface.

12 Claims, 2 Drawing Sheets

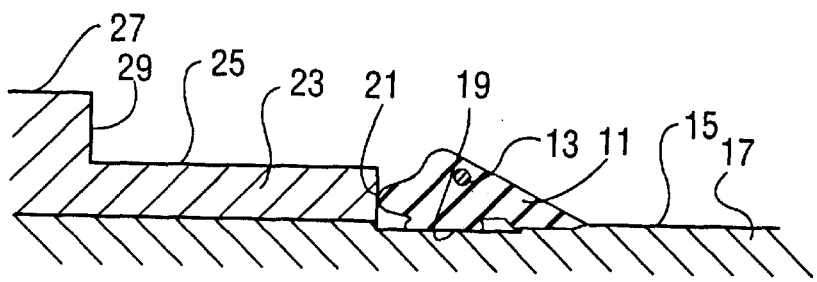
(PRIOR ART) FIG. 4
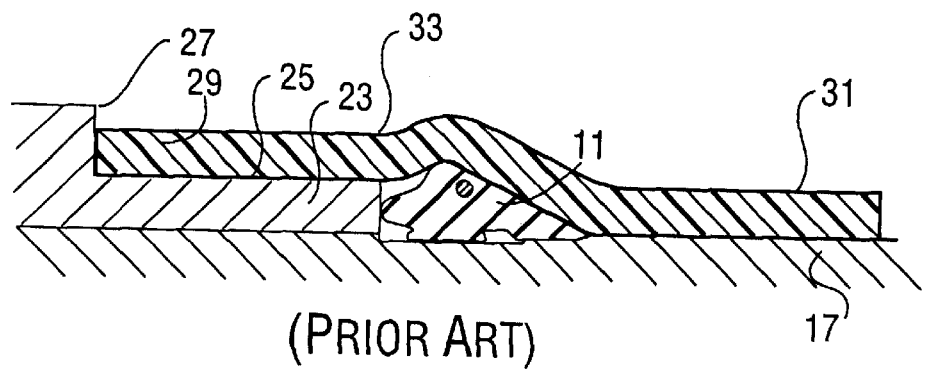
(PRIOR ART) FIG. 5
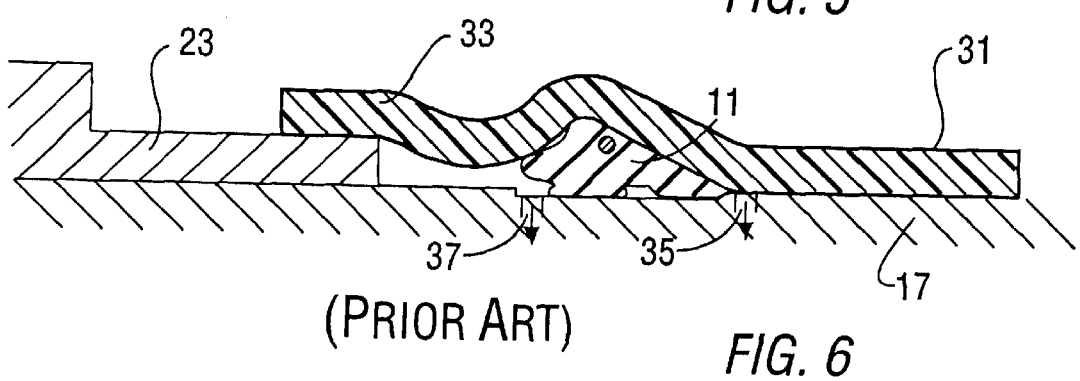
(PRIOR ART) FIG. 6
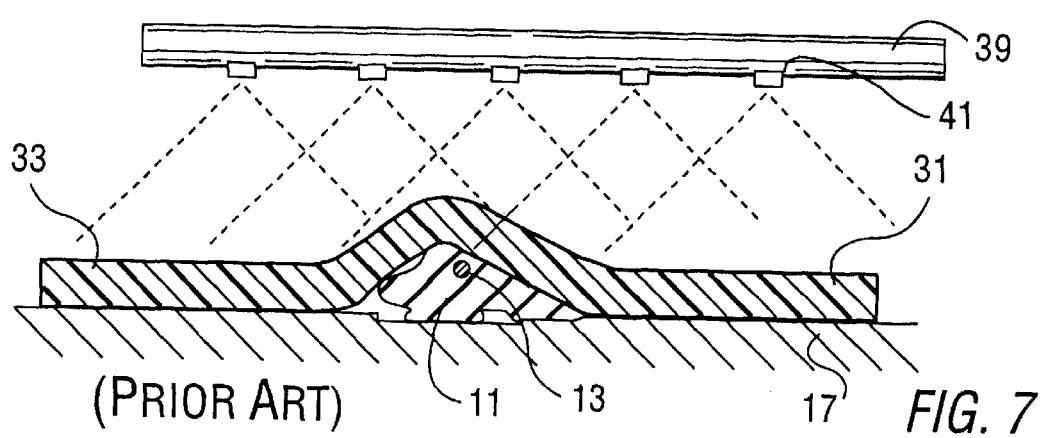
(PRIOR ART) FIG. 7

DUAL PURPOSE LOW INSERTION FORCE GASKET

BACKGROUND OF THE INVENTION

1. Field of the Invention

The present invention relates generally to sealing gaskets used for pipe joints in which a male spigot pipe section is installed within a mating female socket pipe section.

2. Description of the Prior Art

Pipes formed from thermoplastic materials including polyethylene and PVC are used in a variety of industries. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. It is critical, during the installation process, that the gasket not be able to twist or flip since a displaced or dislocated gasket will adversely affect the ultimate sealing capacity of the joint. Previous attempts to stabilize the sealing ring within its mating groove included the provision of internal and external reinforcing rings or bands which provided additional rigidity for the resilient ring.

Attempts were also made to reinforce the pipe groove or adjacent pipe wall. One early attempt to ensure the integrity of pipe joints used under demanding conditions was to provide local reinforcement of the groove portion of the female socket end by means of a heavier wall thickness in this region of the pipe. In some cases, reinforcing sleeves were also utilized. Each of these solutions was less than ideal, in some cases failing to provide the needed joint integrity and often contributing to the complexity and expense of the manufacturing operation. Even in applications where pressure conditions are not as extreme, as in sewer pipe and irrigation pipe, it is desirable to properly position the gasket and insure its integrity.

In the early 1970's, a new technology was developed by Rieber & Son of Bergen, Norway, referred to in the industry as the "Rieber Joint." The Rieber system employed a combined mold element and sealing ring for sealing a joint between the socket end and spigot end of two cooperating pipes formed from thermoplastic materials. In the Rieber process, the elastomeric gasket was inserted within an internal groove in the socket end of the female pipe as the female or belling end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

The Rieber system provided an integrally installed gasket which overcame many of the deficiencies of the prior art devices in maintaining the sealing ring in its proper position during installation and use. As the female socket end of the pipe cooled around the previously installed gasket, the elastomeric body of the gasket was compressed between a steel reinforcing ring and the groove formed in the socket end of the pipe. When the mating spigot was installed to make up a pipe joint, further compression of the gasket occurred in a radial direction along an internal compression region of the gasket.

Despite the advances offered by the Rieber process, the compression seal geometry presented problems in certain field applications. In some applications, particularly involving larger diameter pipe, the insertion force needed to install the male spigot end within the mating female socket end required a high insertion force which could, on some occasions, cause the gasket to be distorted or displaced. Also, with applications involving thin wall pipe such as irrigation pipe, the forces involved during manufacture using a Rieber type process could cause the pipe to stretch, thereby decreasing the wall thickness in the gasket region to unacceptable levels.

The present invention has, as one object, to provide a pipe gasket for use in such diverse systems as sewer pipe and irrigation pipe which offers the advantages of a Rieber style gasket while avoiding the previously mentioned problems encountered in the prior art.

Another object of the invention is to provide such a pipe gasket which provides a lower profile and consequent lower insertion force for the male, spigot end when entering the female, socket end to facilitate assembly of the pipe joint in the field.

Another object of the invention is to provide a sealing system of the above type in which a sealing gasket is installed within a groove provided within a female, socket end of a thermoplastic pipe in which the gasket is designed with a lower profile to facilitate belling operations in a Rieber type process involving thinner wall pipe to reduce stress on the pipe walls adjacent the sealing gasket groove to thereby prevent unacceptable stretching and thinning of the pipe wall.

Another object is to provide an improved gasket for use in such a sealing system in which the gasket is formed from a single, generally homogeneous composition, rather than having distinct regions of diverse materials such as varying durometer rubber regions or regions of plastic and rubber.

Another object of the invention is to provide a gasket with a low profile and lip type configuration which will allow assembly without a chamfer on the spigot end of the pipe.

SUMMARY OF THE INVENTION

A pipe sealing gasket is shown which is designed for receipt within a groove provided within a socket end of a thermoplastic pipe. The gasket includes a ring shaped elastomeric body having a substantially homogeneous composition which, when viewed in cross section, includes a leading nose region and a radially inwardly slanting primary sealing surface which forms a lip seal for engaging a mating spigot end during insertion. The primary sealing surface is joined to a secondary sealing surface by an intermediate circumferential groove region. The secondary sealing surface comprises a planar circumferential region which terminates in an inside corner of the gasket. The inside corner is connected to an outermost wall region of the gasket by an exterior gasket surface, the outermost wall region of the gasket being connected to the nose region of the gasket by vertical step which joins a uniformly sloping external gasket surface.

The gasket dimensions and geometry are selected to provide a low profile which reduces insertion force during assembly of a pipe joint while also eliminating certain problems during manufacturing operations in which the elastomeric gasket was inserted within an internal groove in the socket end of the female pipe as the female or belling end was simultaneously being formed.

BRIEF DESCRIPTION OF THE DRAWINGS

FIGS. 4–7 are simplified, schematic illustrations of the prior art Rieber process for installing a compression, seal gasket within a groove formed within the female socket end of a thermoplastic pipe;

DETAILED DESCRIPTION OF THE INVENTION

Figure 1:
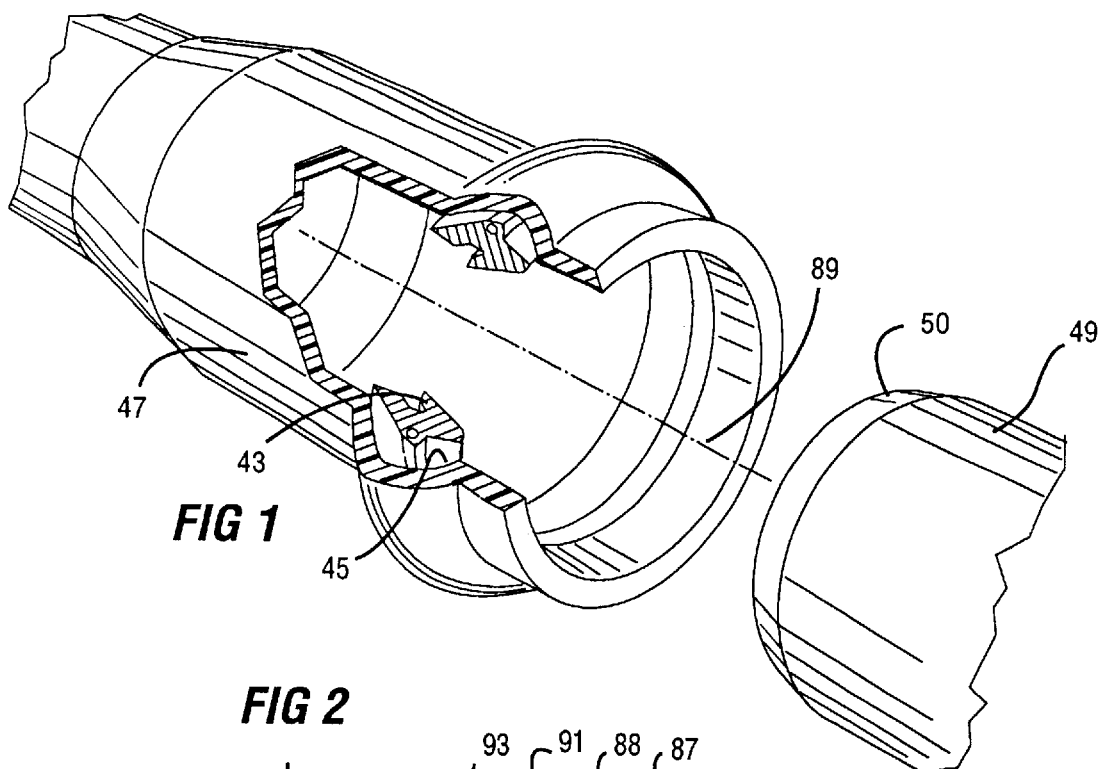
FIG. 1 is a partial, perspective view, partly broken away showing the pipe joint of the invention in which a male spigot pipe end is inserted within a female socket end, the female socket end having a groove for receiving the s ling gasket of the invention.

The advantages provided by the pipe gasket having the improved geometry of the invention can best be understood with reference to the prior art gaskets manufactured according to the Rieber process. Turning first to FIGS. 4–7, the Rieber process is illustrated showing the installation of a prior art compression seal gasket within the groove provided within the socket end of the female pipe section.

FIG. 4 shows an elastomeric sealing gasket 11 having a steel reinforcing ring 13 in place on the generally cylindrical outer working surface 15 of the mandrel 17 used in the belling process. The elastomeric gasket 11 can be formed of, for example, rubber and is a ring shaped, circumferential member having a lower compression region 19 and an exposed nose portion 21 which, as shown in FIG. 4, abuts a back-up or forming collar 23. The forming collar 23 has a first generally cylindrical extent 25 which is joined to a second cylindrical extent 27 by a step region 29, whereby the second extent 27 is of greater external diameter than the first cylindrical extent 25, as shown in FIG. 4.

In the prior art technique, the steel reinforced elastomeric ring 11 is placed onto the working surface of the mandrel 17 and pushed to a position against the backup or forming collar 23. In this position, the gasket is firmly anchored to the mandrel surface In the second step of the process, the socket end 33 of the thermoplastic pipe 31 is heated and pushed over the steel mandrel 17, gasket 11 and back-up collar 23. The socket end is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint.

The socket end 33 flows over the first cylindrical extent 25 of the back-up collar 23 and abuts the step region 29 in the second step of the process.

In the next step of the technique (FIG. 6) the mandrel and pipe move away from the back-up collar 23 and the pipe socket end 33 retracts around the mandrel and gasket 11 due to the elastic forces of the thermoplastic material. Typically, vacuum was also supplied through ports 35, 37 which connected the mandrel working surface with a vacuum source (not shown).

In the last step of the process (FIG. 7), the pipe socket end 33 is cooled by means of a water spray bar 39 and spray nozzles 41. As the cooling takes place, the pipe socket end 33 shrinks around the gasket 11, thus compressing the rubber body of the gasket between the steel reinforcing ring 13 and the socket-groove to establish a firm seal. Because the sealing of the gasket against the socket took place under controlled conditions in the factory, there was no possibility that sand or similar contaminates would penetrate the crucial sealing zone of the gasket during storage, transportation or installation.

The above described Rieber process has been in commercial use since the early 1970's and is described in the above referenced issued United States patents, among other sources. It will thus be well familiar to those skilled in the thermoplastic pipe sealing arts.

FIG. 1 shows a sealing gasket of the invention, designated generally as 43 which is installed within a groove 45 provided within a socket end 47 of a thermoplastic pipe. The gasket 43 has a low profile and an improved geometry so that insertion of the male, spigot pipe section 49 within the female, socket section 47 can be achieved with a minimum insertion force while maintaining the desired sealing characteristics of the pipe joint. The gasket of the invention is useful in diverse sealing applications, including sewer pipe and irrigation pipe. Particularly with respect to irrigation pipe, problems of infiltration are encountered as opposed to problems of exfiltration of the type encountered with many high pressure applications. The gasket of the invention provides the necessary sealing capacity for both sewer pipe and irrigation pipe applications.

Figure 2:
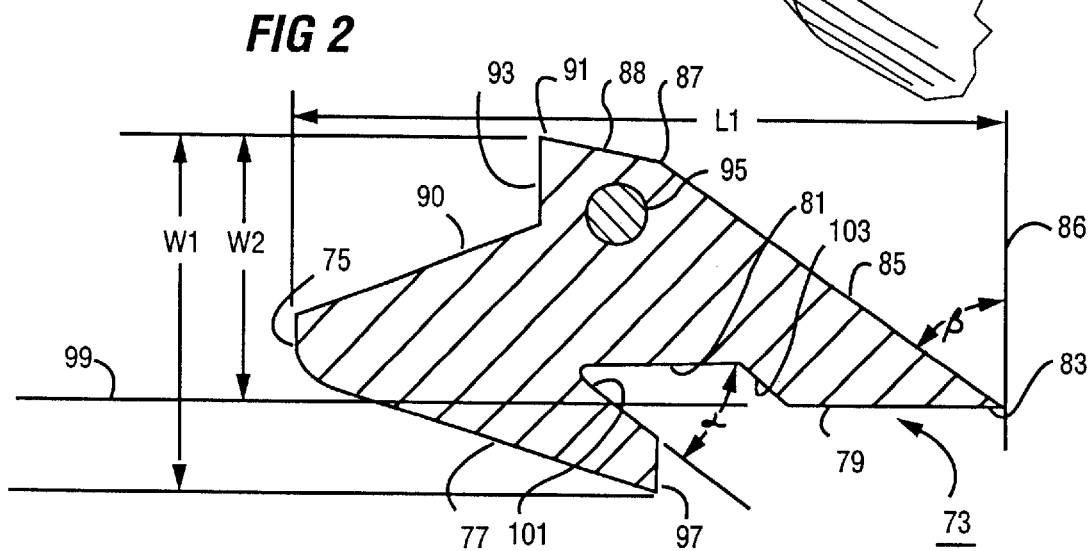
FIG. 2 is a side, cross-sectional view of the sealing gasket of the invention shown in isolated fashion for ease of illustration.
Figure 3:
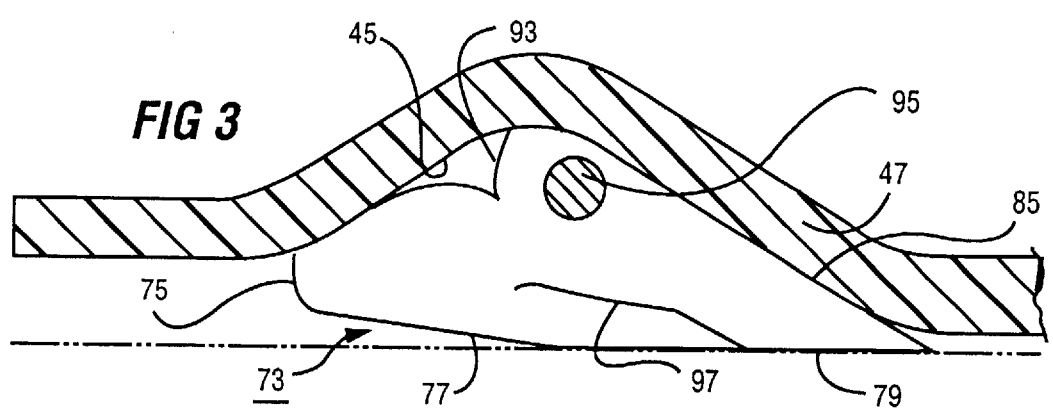
FIG. 3 is a side, cross-sectional view of the gasket of FIG. 2 shown in the compressed position as the male spigot pipe end is inserted within the female socket end to form a joint of pipe.

The improved geometry of the gasket of the invention can best be appreciated with respect to the cross sectional view presented in FIG. 2 of the drawings in which the pipe sealing gasket of the invention is designated generally as 73. The gasket is formed of a generally homogeneous composition, such as from a suitable rubber, rather than including an elastomeric region joined to a rigid plastic region. A 55 Durometer natural or synthetic rubber such as a "SBR" commercial grade rubber provides preferred deformability of the seal. The gasket 73 has a leading nose region 75 which is joined to a radially inwardly slanting primary sealing surface 77 which forms a lip seal for engaging a mating spigot end during insertion. The primary sealing surface 77 is joined to a secondary sealing surface 79 by an intermediate circumferential groove region 81. The secondary sealing region 79 comprises a planar circumferential region which terminates in an inside corner 83 of the gasket.

The inside corner 83 is connected to an outermost wall region of the gasket by an external gasket surface. The external gasket surface, as illustrated at 85 in FIG. 2, begins as a uniformly sloping surface at the inner corner 83. The slope of the surface forms an angle β of approximately 54° with respect to vertical axis 86. The external gasket surface 85 turns at an angle to form a first pitch point 87 of a first radial displacement on the external gasket surface with respect to the pipe horizontal axis 89 (FIG. 1). The external gasket surface continues on to join a second pitch point 91 of greater relative radial displacement than the first pitch point, thereby forming an angled radial region 88. The second pitch point 91 comprises a juncture with a vertical step 93 which joins a downwardly sloping external surface 90 of the gasket to the nose region 75.

A reinforcing element, such as metal ring 95, passes through the ring shaped elastomeric body at one circumferential location.

The gasket of the invention 73 has a length defined between the nose region 75 and the inside corner thereof 83 and has an overall width defined between the outermost wall region pitch point 91 and the lip region innermost extent (97 in FIG. 2). The overall length is illustrated as "L1" in FIG. 2. The overall width is illustrated as "W1" in FIG. 2. In the preferred embodiment illustrated, L1 is approximately 28.8 mm and W1 is approximately 15 mm. Thus the preferred length to width ratio is at least about 2:1. The gasket also has a "mean sealing width", W2, defined as the distance between pitch point 91 and the axis 99 in FIG. 2. The mean sealing width for the particular embodiment of the gasket illustrated in FIG. 2 is 11.25 mm.

In the preferred example illustrated in FIG. 2, the groove region 81 of the gasket includes an inner wall 101 which forms an acute angle α of approximately 40° with respect to the groove surface 81. The groove region also includes an outer wall 103 which forms an obtuse angle with respect to the remainder of the groove region.

The previously described angles and dimensions provide a gasket with an improved geometry, particularly for thin walled plastic pipe and in installations where infiltration is a greater problem than exfiltration. The gasket of the invention also has a lower profile which facilitates assembly of the joint and which facilitates the belling process in a Rieber style manufacturing operation.

Although the male, spigot pipe end 49 illustrated in FIG. 1 has a chamfer 50, the low profile and lip type configuration of the present gasket also allows joint assembly with a non-chamfered spigot. This is useful when a field cut needs to be performed on the spigot end of the pipe.

An invention has been provided with several advantages. The sealing system of the invention provides an integrally formed sealing gasket within a groove provided within a socket end of a thermoplastic pipe which features an improved geometry which is especially useful in sewer and irrigation pipe installations. The dual purpose gasket of the invention overcomes problems of the prior art in reducing the required insertion force for these type installations while maintaining the required degree of seal integrity. The gasket of the invention also eliminates certain problems previously encountered during belling operations in which the pipe wall thickness was a limiting constraint on the ability to simultaneously form a sealing groove and install a sealing gasket.

While the invention has been shown in only one of its forms, it is not thus limited but is susceptible to various changes and modifications without departing from the spirit thereof.

What is claimed is:

1. A pipe sealing gasket designed for receipt within a groove provided within a socket end of a thermoplastic pipe, the gasket comprising:

a ring shaped elastomeric body which, when viewed in cross section, includes a leading nose region and a radially inwardly slanting primary sealing surface which forms a lip seal for engaging a mating spigot end during insertion, the primary sealing surface being joined to a secondary sealing surface by an intermediate circumferential groove region, the secondary sealing surface comprising a planar circumferential region which terminates in an inside corner of the gasket, the inside corner being connected to an outermost wall region of the gasket by an exterior gasket surface, the outermost wall region of the gasket being connected to the nose region of the gasket by vertical step which joins a uniformly sloping external gasket surface;

wherein the external gasket surface begins as a planar uniformly sloping surface at the inner corner of the gasket but turns at an angle to form a first pitch point of a first radial displacement on the external gasket surface with the external gasket surface continuing as a planar surface.

2. The pipe sealing gasket of claim 1, wherein a reinforcing element passes through the ring shaped elastomeric body at one circumferential location.

3. The pipe sealing gasket of claim 1, wherein the external gasket surface continues on from the first pitch point to join a second pitch point of greater radial displacement than the first pitch point and forming an angled radial region on the external gasket surface, the second pitch point comprising the juncture of the vertical step which joins the uniformly sloping external gasket surface to the nose region of the gasket.

4. The pipe sealing gasket of claim 1, wherein the reinforcing element is a rigid ring.

5. The pipe sealing gasket of claim 1, wherein the ring shaped elastomeric body has a substantially homogeneous composition.

6. A pipe sealing gasket designed for receipt within a groove provided within a socket end of a thermoplastic pipe, the gasket comprising:

a ring shaped elastomeric body having a substantially homogeneous composition which, when viewed in cross section, includes a leading nose region and a radially inwardly slanting primary sealing surface which forms a lip seal for engaging a mating spigot end during insertion, the primary sealing surface being joined to a secondary sealing surface by an intermediate circumferential groove region, the secondary sealing surface comprising a planar circumferential region which terminates in an inside corner of the gasket, the inside corner being connected to an outermost wall region of the gasket by an exterior gasket surface, the outermost wall region of the gasket being connected to the nose region of the gasket by vertical step which joins a uniformly sloping external gasket surface; and wherein the gasket has a length defined between the nose region and the inside corner thereof and has a width defined between the outermost wall region and an innermost extent of the lip region thereof, the ratio of the length to width being at least about 2:1.

7. The pipe sealing gasket of claim 6, wherein a reinforcing element passes through the ring shaped elastomeric body at one circumferential location.

8. The pipe sealing gasket of claim 7, wherein the external gasket surface begins as a uniformly sloping surface at the inner corner of the gasket but turns at an angle to form an inner pitch point of a first radial displacement on the external gasket surface.

9. The pipe sealing gasket of claim 8, wherein the external gasket surface continues on to join a second pitch point of greater radial displacement than the first pitch point, the second pitch point comprising the juncture of the vertical step which joins the uniformly sloping external gasket surface to the nose region of the gasket.

10. The pipe sealing gasket of claim 7, wherein the reinforcing element is a rigid ring.

11. A method of forming a pipe joint using a pipe sealing gasket designed for receipt within a groove provided within a female socket end of a first section of pipe for forming a seal between an internal surface of the female socket end and a male spigot end of a mating second pipe section as a given insertion force is used to insert the male spigot end within the female socket end, the gasket having an improved low profile geometry, the method comprising the steps of:

installing a sealing gasket within the groove provided within the female socket end of the first pipe section, the sealing gasket being formed as a ring shaped elastomeric body having a substantially homogeneous composition which, when viewed in cross section, includes a leading nose region and a radially inwardly slanting primary sealing surface which forms a lip seal for engaging a mating spigot end during insertion, the primary sealing surface being joined to a secondary sealing surface by an intermediate circumferential groove region, the secondary sealing surface comprising a planar circumferential region which terminates in an inside corner of the gasket, the inside corner being connected to an outermost wall region of the gasket by an exterior gasket surface, the outermost wall region of the gasket being connected to the nose region of the gasket by vertical step which joins a uniformly sloping external gasket surface; and wherein the gasket is formed to have a length defined between the nose region and the inside corner thereof and is formed to have a width defined between the outermost wall region and an innermost extent of the lip region thereof, the ratio of the length to width being about 2:1 to provide an improved profile which reduces a given insertion force used to insert the male spigot end within the female socket end as a pipe joint is formed.

12. A pipe sealing gasket designed for receipt within a groove provided within a socket end of a thermoplastic pipe, the gasket having a low profile to provide an improved low insertion geometry while lowering belling forces during manufacture of the socket end, the gasket comprising:

a ring shaped elastomeric body having a substantially homogeneous composition which, when viewed in cross section, includes a leading nose region and a radially inwardly slanting primary sealing surface which forms a lip seal for engaging a mating spigot end during insertion, the primary sealing surface being joined to a secondary sealing surface by an intermediate circumferential groove region, the secondary sealing surface comprising a planar circumferential region which terminates in an inside corner of the gasket, the inside corner being connected to an outermost wall region of the gasket by an exterior gasket surface, the outermost wall region of the gasket being connected to the nose region of the gasket by vertical step which joins a uniformly sloping external gasket surface; and wherein the lip seal has an inner wall which forms an angle of approximately 40° with respect to the circumferential groove region.

* * * * *